(12) United States Patent  
Morris et al.

(10) Patent No.: US 9,297,708 B1
(45) Date of Patent: Mar. 29, 2016

(54) METHODS AND SYSTEMS FOR OPTICAL WEAR SENSING

(75) Inventors: Charles E. Morris, Des Peres, MO (US); Thomas Lyman Weaver, Webster Groves, MO (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 13/470,734

(22) Filed: May 14, 2012

(51) Int. Cl.
  *G01N 21/00* (2006.01)
  *G01L 1/20* (2006.01)

(52) U.S. Cl.
  CPC ........................................ *G01L 1/20* (2013.01)

(58) Field of Classification Search
  CPC .............. G01D 5/353; G01D 5/35303; B60R 16/0222; B60R 16/023; G01R 31/008; G01R 31/021; H01B 7/32
  USPC ........ 385/12, 13; 356/237.1–237.3, 600, 240, 356/73.1; 250/559.01, 559.04, 250/559.4–559.45
  See application file for complete search history.

(56) References Cited

U.S. PATENT DOCUMENTS

| | | | |
|---|---|---|---|
| 4,629,316 A * | 12/1986 | Shen et al. .................... | 356/73.1 |
| 5,170,320 A * | 12/1992 | Pease ............................ | 361/690 |
| 5,299,274 A * | 3/1994 | Wysocki et al. ................ | 385/96 |
| 5,308,973 A * | 5/1994 | Odoni et al. ............. | 250/227.17 |
| 5,329,392 A * | 7/1994 | Cohen .............................. | 398/13 |
| 5,581,019 A * | 12/1996 | Minor et al. ................ | 73/114.77 |
| 5,774,605 A * | 6/1998 | Cohen .............................. | 385/22 |
| 6,080,982 A | 6/2000 | Cohen | |
| 6,265,880 B1 | 7/2001 | Born et al. | |
| 6,294,734 B1 * | 9/2001 | Daoud ........................... | 174/665 |
| 6,615,639 B1 * | 9/2003 | Heinzen .............................. | 73/7 |
| 6,949,933 B2 | 9/2005 | Weaver | |
| 7,280,219 B1 * | 10/2007 | Discenzo ...................... | 356/477 |
| 7,999,667 B2 | 8/2011 | Carralero et al. | |
| 2004/0111829 A1 * | 6/2004 | Bruno et al. ..................... | 16/2.2 |
| 2005/0184738 A1 * | 8/2005 | Weaver ......................... | 324/541 |
| 2011/0007996 A1 * | 1/2011 | Huffman ........................ | 385/13 |
| 2011/0061897 A1 * | 3/2011 | Okuhara et al. .......... | 174/153 G |

OTHER PUBLICATIONS

Daniel Harres ( "Optical Phase Domain Reflectometer," Avionics, Fiber-Optics and Photonics Technology Conference, 2007 IEEE , vol., no., pp. 50,51, Oct. 2-5, 2007).*

* cited by examiner

*Primary Examiner* — Tri T Ton
(74) *Attorney, Agent, or Firm* — Armstrong Teasdale LLP

(57) ABSTRACT

Methods and systems for use in monitoring a physical interface between a structural opening and a medium. A system is provided comprising a medium operable to pass through a plurality of structural openings and a sensing system associated with the medium. The sensing system includes at least one physical interface positioned at locations where the medium passes through one of the plurality of structural openings. The at least one physical interface includes at least one waveguide for monitoring changes to the at least one physical interface.

16 Claims, 4 Drawing Sheets

METHODS AND SYSTEMS FOR OPTICAL WEAR SENSING

BACKGROUND

This invention relates generally to wear sensing, and more particularly to methods and systems for optical wear sensing.

Electrical cables that are subjected to vibrations or other movements are often susceptible to chafing damage. Such chafing damage can expose or sever the electrical wires of such cables, resulting in electrical shorts, arcing, and loss of functionality. When such damage is caused to critical electrical cables, such as those utilized in flight control systems of aircraft, catastrophic consequences, including loss of aircraft and life, can result.

Known electrical cables are sometimes used with load bearing products, such as grommets, fluid lines, line supports, etc. For example, aircraft may include a plurality of bulkheads through which electrical cables are passed. Holes in bulkheads enable cables to pass therethrough, but known bulkhead holes contribute to chafing damage. Accordingly, a load bearing product may be used with the hole to protect the electrical cable, however, such load bearing products are also subject to wear, chafing, and failure.

Known load bearing products are typically inspected and replaced as part of routine maintenance. However, because such load bearing products are used throughout an aircraft, many load bearing products are difficult to inspect and/or replace.

Accordingly, there is a need for a system that facilitates continuous wear sensing of load bearing products. Moreover, there is a need for a sensing system that can both provide advance notice of impending load bearing product failure and communicate with a prognostic system to predict overall system health in deeply-buried system components such as aircraft wiring, fuel or hydraulic lines, etc.

BRIEF DESCRIPTION

In one aspect, a system is provided. The system includes a medium operable to pass through a plurality of structural openings and a sensing system associated with the medium. The sensing system includes at least one physical interface positioned at at least one location where the medium passes through one of the plurality of structural openings. The at least one physical interface includes at least one waveguide associated therewith, wherein the ability to pass such signals is associated with monitoring of changes to the at least one physical interface.

In another aspect, a method for monitoring a physical interface between a structural opening and a medium passing therethrough is provided. The method includes applying an optical signal to a first end of an optical network associated with the medium and verifying an integrity of the optical signal with respect to each location where the optical network and the medium pass through the structural opening. The optical network is routed about a circumference of the medium within such structural opening.

In yet another aspect, an apparatus for use with a sensing system is provided. The apparatus is positioned between a structural opening and a medium passing therethrough. The apparatus includes a portion sized to fit within the structural opening, a channel sized to accommodate the medium, and at least one waveguide positioned within the portion such that the at least one waveguide circumscribes the channel.

The features, functions, and advantages that have been discussed can be achieved independently in various embodiments or may be combined in yet other embodiments further details of which can be seen with reference to the following description and drawings.

DETAILED DESCRIPTION

Embodiments described herein facilitate the optical sensing of wear associated with load bearing products. More particularly, embodiments described herein enable a sensing system that can both provide advance notice of impending load bearing failure and communicate with a prognostic system to predict overall system health in deeply-buried system components such as aircraft wiring, fuel or hydraulic lines, etc.

Fiber-optical-grade fibers are inserted into load bearing products, referred to as physical interfaces herein, such as grommets, fluid lines, line supports, etc. for sensing the degradation of the load bearing product and facilitating prognoses for the remaining useful life of the load bearing product to prevent catastrophic or other failure of protected components such as electrical wiring and/or fluid lines in aircraft and/or other vehicle applications.

Figure 1:
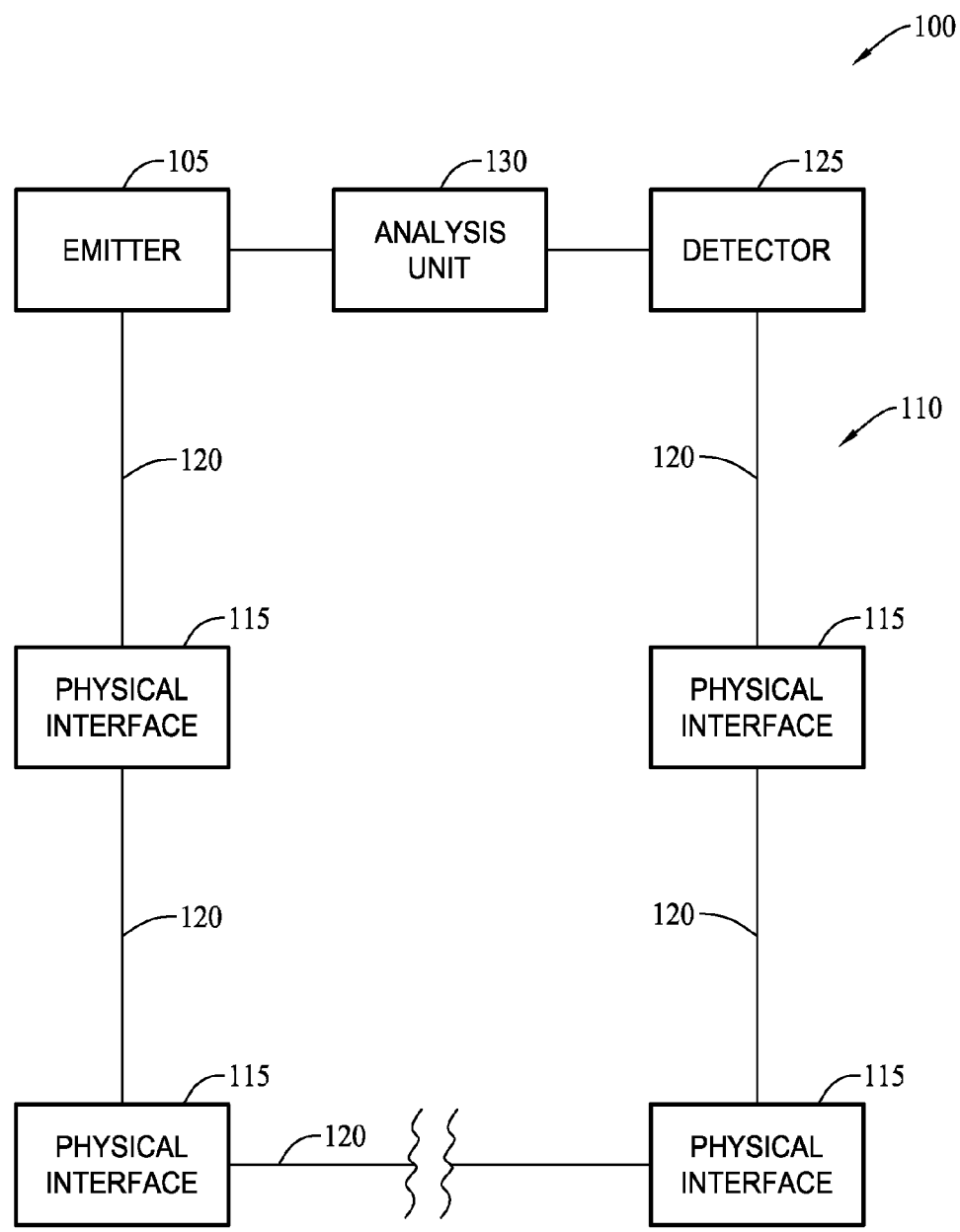
FIG. 1 is a block diagram of an exemplary sensing system.

FIG. 1 is a block diagram of an exemplary sensing system 100. In the exemplary embodiment, an emitter 105 is configured to generate light pulses. Light pulses are channeled from emitter 105 to a network 110 of physical interfaces 115 and optical waveguides 120. Optical waveguides 120 may include fiber optics and/or any optical medium that enables system 100 to function as described herein. Light pulses from emitter 105 are channeled through series-connected network 110 such that the light pulses are directed towards a detector 125.

Detector 125 is configured to detect the light pulses and generate electrical and/or data signals indicative of one or more characteristics of the light pulses. Signals from detector 125 are transmitted to an analysis unit 130 that is capable of detecting, based on the signals or lack of signals, gradual changes in network 110 such as stress and strain measurements, as well as chafing and temperature.

Analysis unit 130 includes at least one processor (not shown) capable of receiving signals from detector 125, analyzing the received signals, and/or outputting information, alarms, signals, data, etc. in response to, or representative of, the received signals. Analysis unit 130 may be further configured to selectably control the light pulses emitted by emitter 105 by transmitting control signals to emitter 105. In the exemplary embodiment, analysis unit 130 is an optical phase domain reflectometer. Alternatively, analysis unit 130 may be any signal analyzer that enables system 100 to function as described herein.

Figure 2:
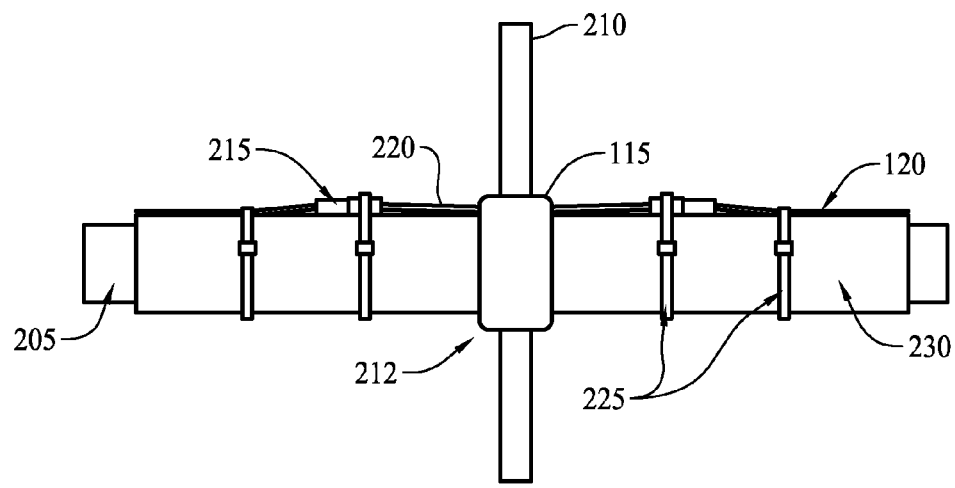
FIG. 2 is a side view of an exemplary physical interface for use with the sensing system of FIG. 1.

FIG. 2 is a side view of an exemplary physical interface 115 for use with sensing system 100. Physical interface 115 is associated with and circumscribes a medium 205, such as an electrical cable/cables, fuel or hydraulic lines, etc. Medium 205 passes through a support structure 210, such as a bulkhead, via a structural opening 212. Medium 205 is operable to pass through a plurality of structural openings 212, each in a plurality of support structures 210. Physical interface 115 is positioned within structural opening 212 such that medium 205 is supported by physical interface 115. Structural opening 212 may wear medium 205 and so physical interface 115 is sized and configured to reduce wear points between structural opening 212 and medium 205. However, physical interface 115 may wear and/or fail causing medium 205 to directly contact support structure 210. As described in more detail herein, sensing system 100 is capable of detecting wear on physical interface 115.

In the exemplary embodiment illustrated in FIG. 2, physical interface 115 is a grommet. Alternatively, physical interface 115 may be any component capable of supporting and/or protecting medium 205. While grommets, bulkheads, and aircraft are used as examples herein, it is contemplated that system 100 and/or physical interface 115 may be used in a variety of applications, whether in a vehicle or not, wherever component wear may occur.

In the exemplary embodiment, optical waveguide 120 is an optical ribbon cable coupled to physical interface 115 via an optical ribbon connector 215. A coupling waveguide 220 couples optical ribbon connector 215 to physical interface 115. Optical waveguide 120 and/or connector 215 may be coupled to medium 205 using one or more mechanical fasteners 225, e.g., cable ties. In the exemplary embodiment, medium 205 includes a sheath 230, such as a Nomex® overbraid. Nomex® is a registered trademark of E. I. du Pont de Nemours and Company.

Figure 3:
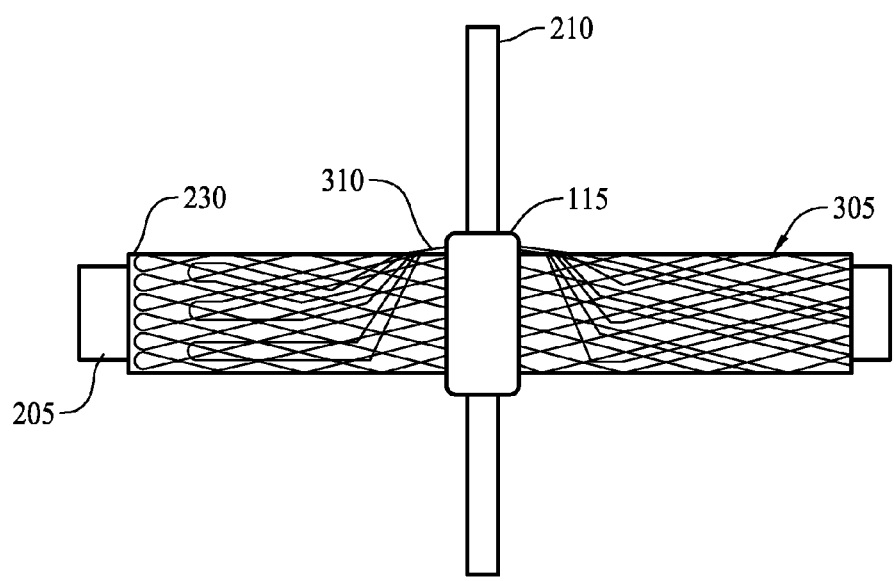
FIG. 3 is a side view of an alternative configuration of the physical interface shown in FIG. 2.

FIG. 3 is a side view of an alternative configuration of physical interface 115 shown in FIG. 2. In the exemplary embodiment of FIG. 3, optical waveguide 120 includes a plurality of waveguides 305 that are coupled to, and/or form part of, sheath 230 and circumscribe medium 205. A plurality of coupling waveguides 310 couple waveguides 305 to physical interface 115.

Waveguides 305 in combination with physical interfaces 115 enable sensing system 100 to detect wear and other changes to sheath 230 and/or medium 205. Some or all of waveguides 305 may couple to physical interface 115. In the case where only some waveguides 305 couple to physical interface 115, analysis unit 130 (shown in FIG. 1) may be configured to selectably measure and detect wear in sheath 230 separate from wear in physical interface 115.

Figure 4:
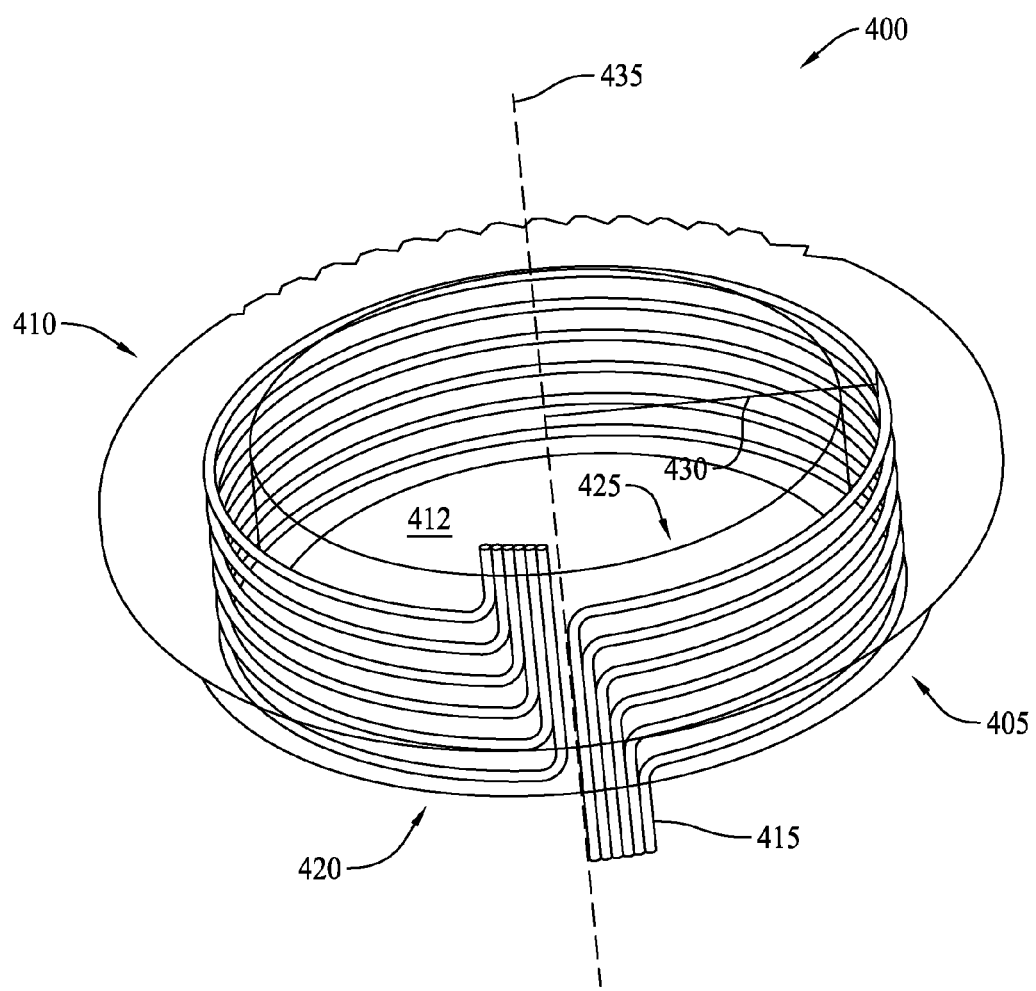
FIG. 4 is a perspective view of an exemplary grommet for use with the sensing system of FIG. 1.
Figure 5:
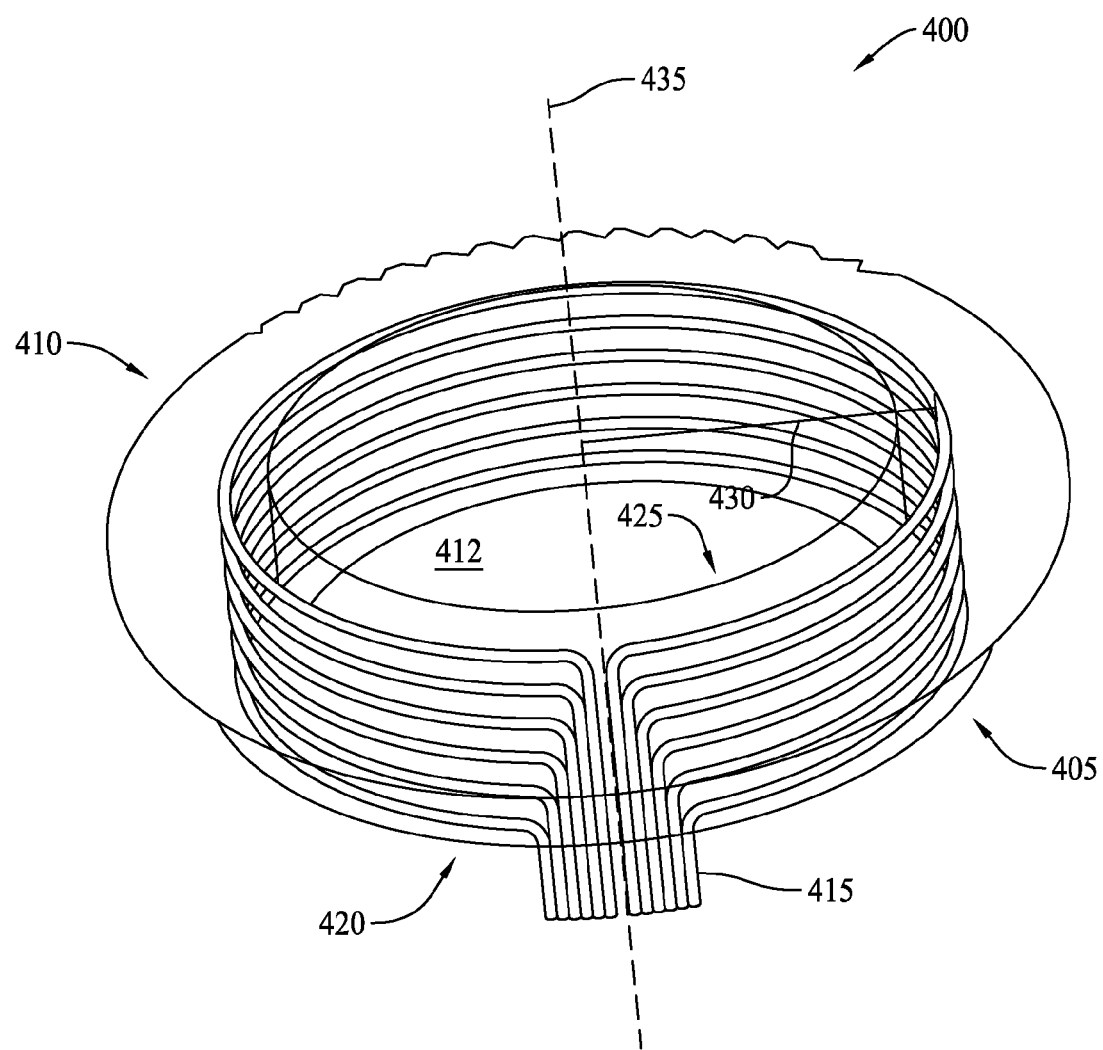
FIG. 5 is a perspective view of an alternative grommet for use with the sensing system of FIG. 1.

FIG. 4 is a perspective view of an exemplary grommet 400, i.e., physical interface 115, that may be used with system 100. In the exemplary embodiment, grommet 400 is substantially annular. A first portion 405 is sized to fit within a bulkhead hole, e.g., structural opening 212, and a second portion 410 forms a flange around the hole. Grommet 400 includes a channel 412 through which a medium, e.g., medium 205, may be routed. A plurality of waveguides 415 enter grommet 400 from a first side 420 and exit grommet 400 from a second side 425. Alternatively, waveguides 415 may exit grommet from first side 420, as shown in FIG. 5.

In the exemplary embodiment, waveguides 415 are positioned within grommet 400 and circumscribe channel 412 with a uniform radius 430 with respect to a centerline 435 of channel 412. Alternatively, or additionally, waveguides 415 may be positioned in any configuration, shape, or orientation that enables grommet 400 to function as described herein. More particularly, waveguides 415 may be positioned proximate to any load-contacting surface of grommet 400 or physical interface 115. Waveguides 415 are coupled to waveguides 120 and are part of network 110.

In the exemplary embodiment, grommet 400 is a molded silicone and/or rubber product and waveguides 415 are fiber-optic-quality glass fibers embedded within the molded silicone and/or rubber. Alternatively, grommet 400 and waveguides 415 may be any material that enables grommet 400 to function as described herein. Glass fibers, in contrast to plastic fibers, may be used over long distances, enabling grommet 400 and physical interface 115 to be deeply buried within an aircraft or other vehicle. In addition, due to the inherent distortions of the sensing signal (i.e., the optical return) in plastic fibers, very little can be interpreted from the signal regarding the degree of degradation being caused by wear. In contrast, the sensing signal within glass fibers is capable of detecting slight chafing. Moreover, glass fibers, due to signal performance improvements over plastic fibers, enable sensing of gradual changes in stress and strain measurements, chafing, and/or temperature.

During operation, an optical signal (i.e., a light pulse), is emitted from emitter 105 into waveguide 120. The optical signal is channeled through at least one physical interface 115, e.g., grommet 400, before being channeled to a detector 125. Detector 125 converts the optical signal into an electric signal that is transmitted to analysis unit 130. Analysis unit 130 detects changes in the optical signal that are indicative of change, wear, chafing, and other damage in waveguides 120 and physical interface 115. More particularly, analysis unit 130 verifies the integrity of the optical signal transmitted through network 110 by comparing the received optical signal with a reference signal, such as a previously-received signal, a pre-determined signal, and/or a calculated expected signal. Alternatively, or additionally, analysis unit 130 may use algorithms to analyze the detected optical signal. Because system 100 and analysis unit 130 may operate during the operation of an aircraft or other vehicle, warnings and other alarms may be provided to operators and/or ground crews immediately after damage is detected. Moreover, because analysis unit 130 is capable of detecting gradual changes within waveguides 120 and physical interface 115, analysis unit 130 can assess the health of network 110 and predict, using the current state of waveguides 120 and physical interface 115 and the rate of change of the same, probable failures of physical interface 115.

Accordingly, exemplary embodiments enable the detection and prognostication of wear and other damage to physical interfaces that protect electrical cables, fuel and hydraulic lines, and other mediums within aircraft, other vehicles, and in other applications. As compared to known methods and systems that are used for wear detection, the above-described systems and methods enable monitoring of deeply-buried components that would otherwise be difficult to access and inspect. The period of monitoring may be continuous during flight or vehicle operation and may provide a means of condition-based maintenance (i.e., inspect and replace as needed) rather than periodic maintenance, which is labor intensive and expensive. The above-described systems and methods enable the detection of wear and impact damage. As mediums, like electrical cables, whether sheathed or not, may have a textured surface, the movement of a medium through a physical interface, like a grommet, may wear the physical interface, eventually resulting in failure of the physical interface and exposure of the medium to damaging surfaces like the edges of a bulkhead hole.

The above-described systems and methods enable a plurality of physical interfaces to be monitored using a single emitter, detector, and analysis unit. Physical interfaces are connected in series using waveguides. Waveguides are also positioned within the physical interface proximate to load contact surfaces. An optical signal is transmitted from the emitter, through a network of physical interfaces, to the detector. The emitter and detector may be positioned at the same end of the medium, in which case the waveguides return the signal from the opposite medium end to the originating end. The emitter and detector may also be positioned at opposite ends of the medium, in which case the waveguides channel the signal from a first medium end to a second medium end. The analysis unit detects changes in the optical signal indicative of wear, chafing, impact damage, and other damage to the physical interfaces. Waveguides may also be positioned around mediums for detecting degradation or damage to the medium or a sheath that circumscribes the medium.

It will be understood by those of skill in the art that information and signals may be represented using any of a variety of different technologies and techniques (e.g., data, instructions, commands, information, signals, bits, symbols, and chirps may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present disclosure have been described in detail, it will be understood by those skilled in the art that various modifications can be made therein without departing from the spirit and scope of the disclosure as set forth in the appended claims.

A controller, computing device, or computer, such as described herein, including the analysis unit, may include at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system comprising:
   a medium operable to pass through a plurality of structural openings; and
   a sensing system coupled to said medium, wherein said sensing system comprises:
      a plurality of physical interfaces each positioned at locations where said medium passes through the plurality of structural openings, said plurality of physical interfaces including a channel defined therethrough and at least one waveguide associated therewith, wherein said at least one waveguide comprises a medium waveguide coupled to said medium, an interface waveguide coupled to said physical interface, and a coupling waveguide coupled between said medium waveguide and said interface waveguide, wherein said interface waveguide completely circumscribes said channel, said medium waveguide, said coupling waveguide, and said interface waveguide configured to pass optical signals therethrough, wherein the ability to pass such optical signals is indicative of monitoring of physical wear to said plurality of physical interfaces;
      an emitter configured to channel the optical signals through said at least one waveguide;
      a detector coupled in communication with said emitter, wherein said at least one waveguide is coupled between said emitter, said plurality of physical interfaces, and said detector in series such that the optical signals from said emitter are detected at said detector; and
      an analysis unit coupled in communication with said detector, said analysis unit configured to determine physical wear to said plurality of physical interfaces based on the optical signals received at said detector.

2. A system in accordance with claim 1, wherein said medium comprises at least one of an electrical cable, a fuel line, and a hydraulic line.

3. A system in accordance with claim 1, wherein said medium comprises a sheath that circumscribes said medium, wherein said sheath includes at least one sheath waveguide for monitoring changes to said sheath, said at least one sheath waveguide is coupled to said sensing system.

4. A system in accordance with claim 3, wherein said at least one sheath waveguide is one of coupled to and embedded within said sheath.

5. A system in accordance with claim 4, wherein said at least one sheath waveguide is coupled to said interface waveguide.

6. A system in accordance with claim 1, wherein said analysis unit comprises an optical phase domain reflectometer.

7. A system in accordance with claim 1, wherein each of said medium waveguide, coupling waveguide, and said interface waveguide is a glass fiber.

8. A system in accordance with claim 7, wherein said at least one physical interface is a grommet having said channel defined therethrough.

9. A method for monitoring a plurality of physical interfaces defined at least partially by a structural opening sized to receive a medium passing therethrough, said method comprising:

applying an optical signal from an emitter to a first end of an optical network coupled to the medium; and receiving the optical signal at a detector coupled at a second end of the optical network, and coupled to an analysis unit such that an integrity of the optical signal with respect to each location where the optical network and the medium pass through the structural opening is verified, wherein the optical network includes at least one waveguide coupled in series between the emitter, a plurality of physical interfaces, and the detector such that the optical signal is detected at the detector, said at least one waveguide further including a medium waveguide coupled to the medium, an interface waveguide coupled to the physical interface, and a coupling waveguide coupled between the medium waveguide and the interface waveguide, wherein the interface waveguide completely circumscribes the structural opening, wherein the analysis unit is configured to determine physical wear of the physical interfaces based on the optical signal received at the detector.

10. A method in accordance with claim 9, wherein receiving the optical signal comprises verifying an integrity of an optical signal intended to pass through the medium waveguide, the coupling waveguide, and the interface waveguide, wherein the interface waveguide defines a circumference and is embedded within a grommet placed within such structural opening.

11. A method in accordance with claim 10, wherein receiving the optical signal comprises coupling the interface waveguide within the grommet to the medium waveguide via an optical ribbon connector.

12. A method in accordance with claim 9, wherein applying an optical signal to a first end of an optical network associated with the medium comprises transmitting a light pulse from an emitter into the medium waveguide.

13. An apparatus for use with a sensing system, wherein said apparatus is positioned along a plurality of structural openings having a medium passing therethrough, said apparatus comprising:

an annular member sized to fit within each structural opening in the plurality of structural openings;

a channel defined by said annular member, and sized to accommodate the medium; and at least one interface waveguide positioned within said annular member such that said at least one interface waveguide completely circumscribes said channel, and such that said at least one interface waveguide extends between the plurality of structural openings in series, wherein said interface waveguide is coupled to a coupling waveguide, and wherein said coupling waveguide is coupled to a medium waveguide such that said interface waveguide, said coupling waveguide, said medium waveguide are configured to channel an optical signal therethrough, said signal indicative of physical wear of the apparatus.

14. An apparatus in accordance with claim 13, wherein said interface waveguide enters said apparatus on a first side and exits said apparatus from one of said first side and a second side.

15. An apparatus in accordance with claim 13, wherein said interface waveguide, said coupling waveguide, and said medium waveguide are optical fibers.

16. An apparatus in accordance with claim 13, wherein said annular member is molded from silicone.

\* \* \* \* \*